(12) United States Patent
Sham et al.

(10) Patent No.: US 6,363,837 B1
(45) Date of Patent: Apr. 2, 2002

(54) JUICE EXTRACTOR AND BEVERAGE MIXER APPARATUS

(76) Inventors: John C. K. Sham, c/o Pentalpha Hong Kong Limited, 12/F. Kin Teck Industrial Building, 26 Wong Chuk Hang Road, Aberdeen (HK); Kumkit Kunavongvorakul, 889 Thai C.C. Tower, 18th Floor, Rm 183 South Sathorn Road, Yannawa, Sathorn Bangkok (TH), 10120

( * ) Notice: Subject to any disclaimer, the term of this patent is extended or adjusted under 35 U.S.C. 154(b) by 0 days.

(21) Appl. No.: 09/578,091

(22) Filed: May 24, 2000

Related U.S. Application Data (63) Continuation-in-part of application No. 09/212,102, filed on Dec. 15, 1998, now Pat. No. 6,070,519.

(51) Int. Cl.[7] .............................. A47J 43/14; A23N 1/00
(52) U.S. Cl. .............................. 99/348; 99/357; 99/492; 99/503
(58) Field of Search .......................... 99/348, 503, 501, 99/502, 492, 357, 505, 506, 508

(56) References Cited

U.S. PATENT DOCUMENTS

| | | |
|---|---|---|
| 1,509,981 A | 9/1924 | Rice |
| 1,563,413 A | 12/1925 | Whitcomb |
| 1,949,675 A | 3/1934 | Bush |
| 2,002,333 A * | 5/1935 | Strauss ........................ 99/503 |
| 2,003,259 A | 5/1935 | Gilbert et al. ................ 99/501 |
| 2,074,708 A | 5/1937 | Smith .......................... 99/501 |
| 2,176,377 A | 10/1939 | Gamble |
| 2,269,853 A | 1/1942 | Knapp .......................... 99/501 |
| 2,315,018 A | 3/1943 | Lawrence ..................... 99/501 |
| 2,552,572 A | 5/1951 | Mikina |
| 3,566,939 A | 3/1971 | Hubrich |
| 4,240,338 A | 12/1980 | McClean ..................... 99/501 |
| 4,309,942 A | 1/1982 | Da Silva, Jr. ................ 99/501 |
| D290,329 S | 6/1987 | Bulto ........................... D7/49 |
| 5,193,447 A | 3/1993 | Lucas et al. .................. 99/508 |
| 5,355,784 A | 10/1994 | Franklin et al. ............. 99/492 |
| D366,984 S | 2/1996 | Hsu ............................ D7/376 |

* cited by examiner

Primary Examiner—Reginald L. Alexander
(74) Attorney, Agent, or Firm—Peter S. Canelias (57) ABSTRACT

A juice extractor module includes a cover and a juice extractor fluted dome and pulp filter which filters the extracted juice. A second module is formed by a pitcher. The juice flows into the pitcher through the pulp filter of the first module. A paddle depends from a third module and is driven by a motor and gears simultaneously with the extractor, for mixing the extracted juice and other ingredients such as water, sweeteners, etc. The third module contains the motor, drive gears and switch in substantial fluid isolation from the first and second compartments, for driving the paddle and the juice extractor. Different extractors may be attached for different size fruits. A lid may be attached over the pitcher for juice/beverage storage.

33 Claims, 12 Drawing Sheets

JUICE EXTRACTOR AND BEVERAGE MIXER APPARATUS

CROSS-REFERENCE TO RELATED APPLICATION

This application is a continuation in part of application Ser. No. 09/212,102 to the same inventors, filed on Dec. 15, 1998 now U.S. Pat. No. 6,070,519

INCORPORATION BY REFERENCE

The disclosure of application Ser. No. 09/212,102 is incorporated herein by reference.

BACKGROUND OF THE INVENTION

The present invention relates to juice extractors for extracting juice from fruit, such as citrus fruit, combined with a mixer device for mixing the extracted juice with a variety of additional ingredients to make juice beverages.

Juice extractors are known and comprise a fluted undulating convex tapered generally cone shaped member that tapers to an apex. The member extends from a surrounding trough having a means of discharging the extracted juice such as a pouring spout. Citrus fruit such as oranges, lemons, and grapefruit are manually pressed against the tapered member and rotated thereagainst to ream the pulp and juice from the fruit which collects in the trough. Such extractors are typically molded thermoplastic.

Improvements to extractors have included drive motors to rotate the reaming tapered member and to supply power to a mixing mechanism to mix beverages. The present invention provides a solution to the problem of combining a juice extractor and beverage mixer in a single apparatus where both the mixer and juice extractor are driven by a common drive located in a drive module.

BRIEF SUMMARY OF THE INVENTION

In accordance with the illustrative embodiments demonstrating features and advantages of the present invention, there is provided a juice extractor and beverage mixing apparatus comprising a juice extraction module; a beverage mixing module; and a drive module operationally coupled to the extraction module and the beverage mixing module for extraction of juice from fruit and for mixing the extracted juice with additional ingredients to produce a beverage in the mixing module.

A juice extractor and beverage mixer according to a further aspect of the present invention comprises releasably attached and fluid coupled first and second compartments. A juice extractor device extracts juice from fruit inserted in the first compartment. A beverage mixing device is coupled to the second compartment, the second compartment receives the extracted juice from the first compartment and receives beverage ingredients, the mixing device mechanically stirring and mixing a juice beverage from the received juice and ingredients.

In one aspect, electrically operated means are coupled to the compartments for operating the extractor and mixing devices.

In a further aspect, a third compartment is included releasably coupled to the first and second compartments forming a plurality of modules, electrically operated drive means are in the third compartment in substantial fluid isolation from the first and second compartments for operating the extractor and mixing device.

In a further aspect, the drive means includes first and second drive shafts rotatably driven by a motor, the first drive shaft extending into the first compartment for operating the juice extractor device, the second drive shaft being coupled to the second compartment for operating the mixing device.

In a further aspect, gear means in the third compartment are responsive to the motor for operating the first and second drive shafts and respective extractor and mixing devices at corresponding rotational speeds.

In a further aspect, the third compartment is in substantial fluid isolation relative to the first and second compartment.

In a still further aspect, the motor and gear means include means for operating the first drive shaft at a different rotational speed than the second drive shaft.

Preferably, the motor and gear means include means for operating the first drive shaft at a slower speed than the second drive shaft.

The extractor preferably comprises a convex fruit receiving member with a fluted undulating outer fruit receiving surface terminating at an apex, the mixer device comprising a paddle, the drive means for selectively rotating the paddle and the fruit receiving member.

In a further aspect, transmission means are responsive to the motor for rotating the paddle and fruit receiving member simultaneously.

Preferably the drive means includes transmission means for rotating the fruit receiving member at a slower speed than the paddle.

In a further aspect, the third compartment is coupled to the first and second compartments, drive means are in the third compartment for operating the extractor device and the mixing device, the compartments each comprising corresponding interengaged housing portions forming corresponding modules.

Preferably, the housing portions are releasably interengaged. Also, preferably a pouring spout is formed in the second compartment housing portion and the third compartment includes means juxtaposed with the spout when engaged with the second compartment for providing an overfill gap for liquid in the second compartment.

In a further aspect, the first compartment forms a module comprising a lid and a trough for receiving and enclosing the extractor, an intermediate housing portion forms a modular third compartment for receiving the electrically operated means and a pitcher having a handle and a pouring spout forms a module comprising the second compartment.

Further, in accordance with the illustrative embodiments demonstrating features and advantages of the present invention, there is provided a juice extractor and beverage mixing apparatus comprising a juice extractor, a beverage mixer with an annular configuration, a drive mechanism below the juice extractor and beverage mixer which operates the juice extractor and beverage mixing apparatus. The beverage mixer is provided with an aperture in substantial fluid isolation from the beverage mixer, so that the drive spindle may project through the aperture and operate the juice extractor and the paddle which rotates through the beverage mixer, the paddle having a plurality of arms, each projecting outwardly and axially from the drive spindle.

Further, in accordance with the illustrative embodiments demonstrating features and advantages of the present invention, there is provided a juice extractor and beverage mixing apparatus comprising a juice extractor, a beverage mixer, a drive mechanism below the juice extractor and beverage mixer which operates the juice extractor and beverage mixing apparatus where the juice extractor and beverage mixer are side-by-side. The drive spindle may operate the juice extractor and the mixing paddle by means of a belt and gears which ensure that the juice extraction process and the mixing process can be performed simultaneously where the beverage mixer is in fluid communication with the juice extractor by means of a spout through which the extracted juice exits the juice extractor and enters the beverage mixer.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

First Preferred Embodiment

In the FIGS. 1—7 of the first preferred embodiment, apparatus 2 includes a juice extraction and collection module 3, a drive module 5 and a mixing module 7. The module 3 includes a preferably molded thermoplastic transparent cover 4 and juice collector 12. The cover 4 comprises a hollow cone-shaped dome 6 and an outer peripheral flange 8. The flange terminates in lip 10.

The juice collector 12 comprises a housing 13 and extractor 26. The cover 4 lip 10 engages juice collector 12 housing 13 annular rim 14. Collector 12 housing 13 is preferably one piece molded thermoplastic material and has an annular trough 16 formed by an upright outer wall and a central upright cylindrical collar 18, FIGS. 5 and 7, defining a central bore 20. An elongated arcuate bore 22, FIG. 6, is in the trough 16. An extension 24 depends from the trough 16. Bore 22 passes through the extension 24. The housing 13 and cover 4 form a first juice extraction compartment 15.

Figure 4:
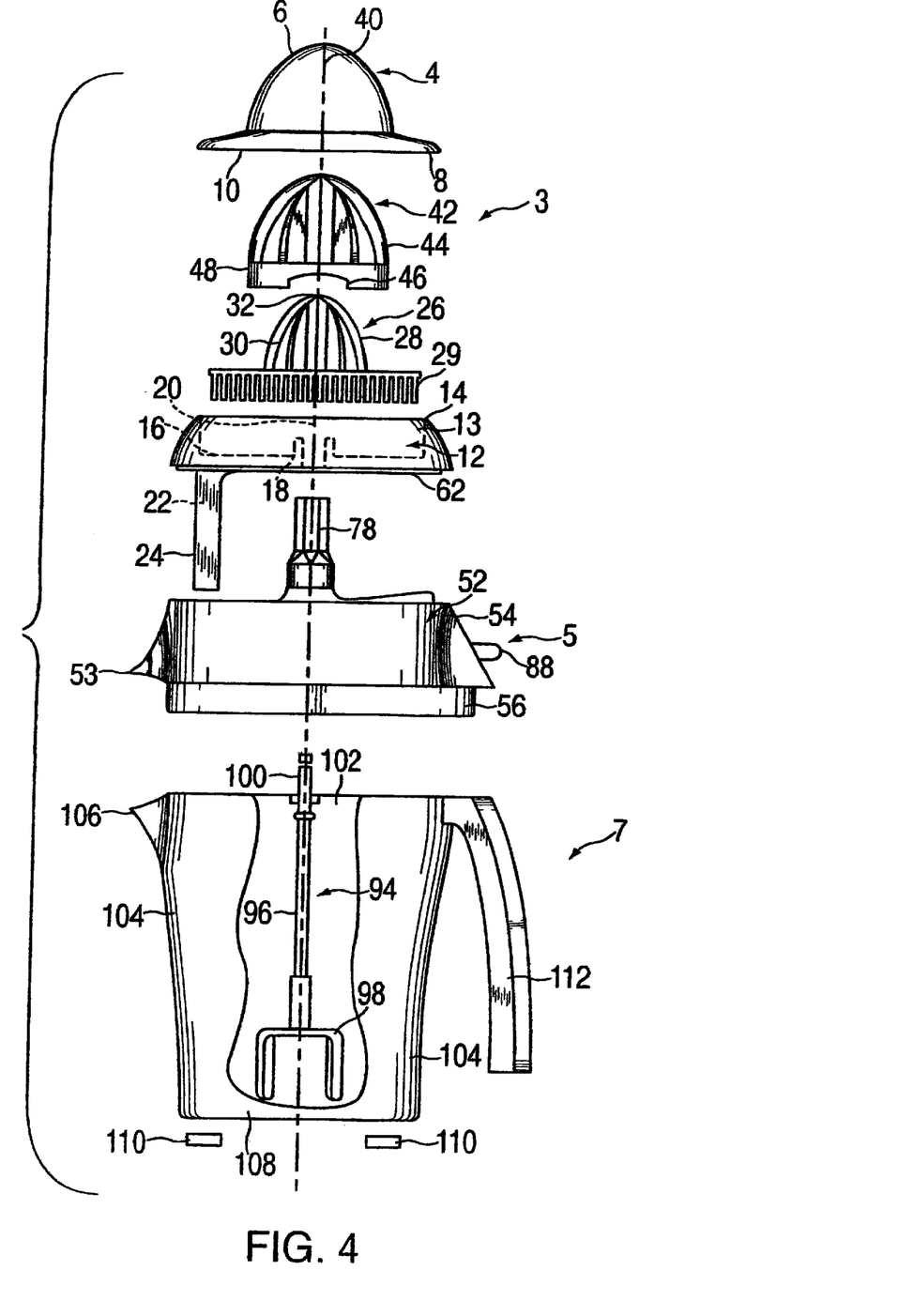
FIG. 4 is an exploded side elevation view, partially in section, of the apparatus of FIG. 1.

The juice extractor 26, FIG. 4, is located in the compartment 15 and is preferably one piece molded thermoplastic material. The extractor 26 comprises a conventional fluted dome 28 with undulations 30 forming fruit reaming ridges and troughs that terminate at apex 32. Extractor 26, FIGS. 5 and 7, has a bottom wall 34 and an outer wall 36 forming a trough 38 surrounding the dome 28. A plurality of fingers 29 depend from outer wall 36 forming a pulp filter. In the alternative, a screen structure may also form a filter in the bottom wall of trough 38, or, in the alternative, the filter may comprise any convenient apertured arrangement for filtering the pulp from the juice.

The extractor 26 rotates relative to housing 13. The trough 38 fits within the trough 16 of the housing 13. A juice drainage opening (not shown) in the extractor trough 38 bottom wall 34 coincides with the bore 22. Juice collecting in the trough 38 from reamed fruit flows through the drainage opening into the bore 22 through the juice drainage extension 24. The collar 18 is centrally within the dome 28 on axis 40. Juice is extracted from citrus fruit by the rotating extractor dome 28 in the module 3 as described below.

A second larger optional hollow extractor 42, releasably fits over the extractor 26 dome 28. The inner smaller extractor 26 may be for use with lemons or oranges and the extractor 42 may comprise different extractors of different sizes for use with grapefruit, for example. The extractor 42 has a fluted fruit reaming dome 44 and a recess 46 in its lower r i m 48. The recess 46 mates with a boss (not shown) in the extractor 26 trough 38. The recess 46 and mating boss (not shown) rotationally fixedly secure extractor 42 to the extractor 26 s o that rotation of the extractor 26 about axis 40 rotates the extractor 42. The r i m 48 mates about a central upstanding boss 50 in the extractor 26, FIG. 5.

Drive module 5 comprises a molded two piece thermoplastic annular housing 52. Housing 52 has an upper member 54 which mates with and is fixed to lower member 56, FIGS. 5 and 7, by screws 57. The housing 52 has a spout portion 53. The members 54 and 56 form a compartment 58. The members 54 and 56 include a conduit 60 for receiving the extension 24 therethrough. The collector 12 housing 13, FIG. 4, has a lower lip 62 which mates with and is received in an annular recess in the housing member 54.

Figure 5:
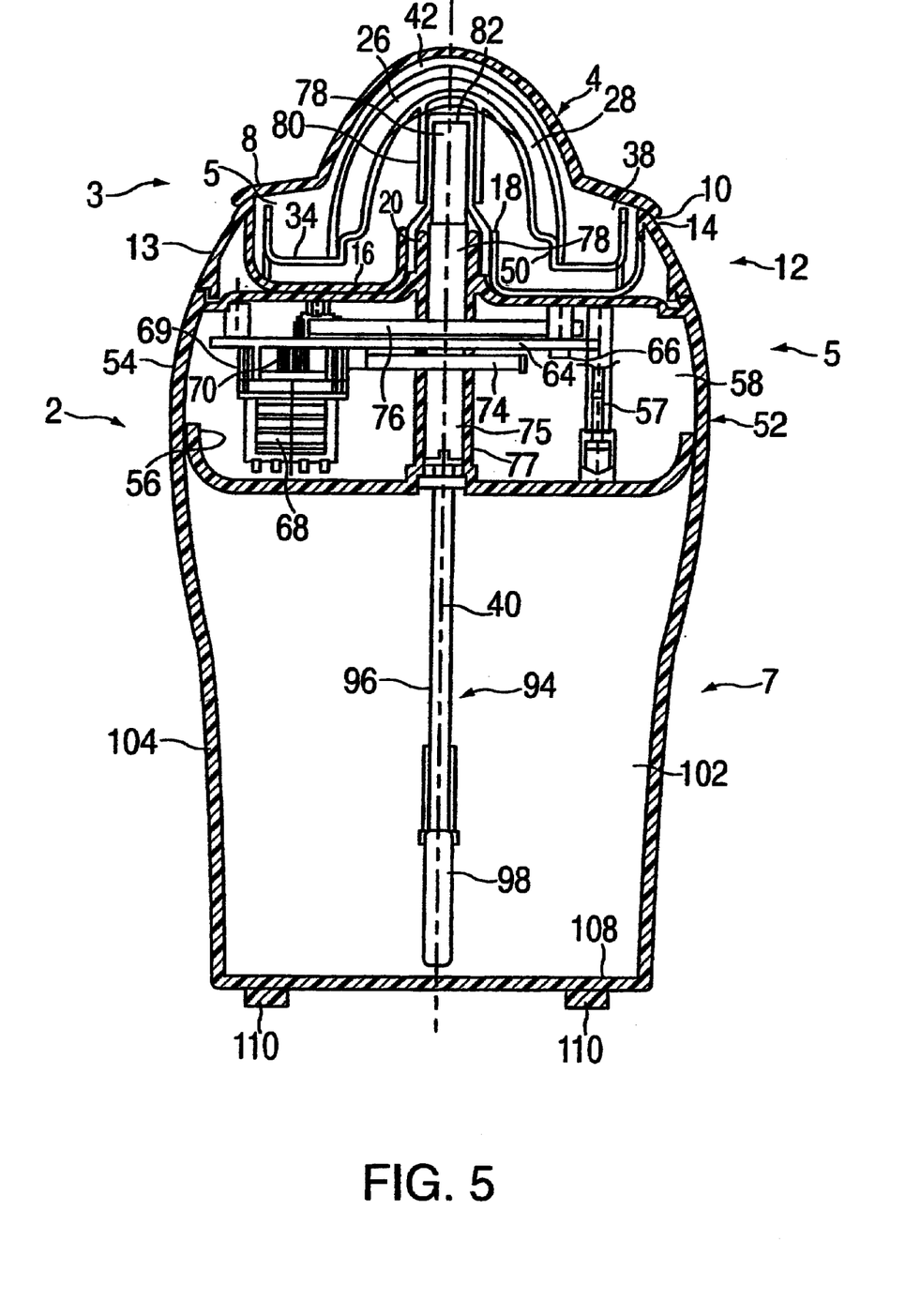
FIG. 5 is a side elevation sectional view of the apparatus of FIG. 1 taken along lines 5—5 of FIG. 1.
Figure 6:
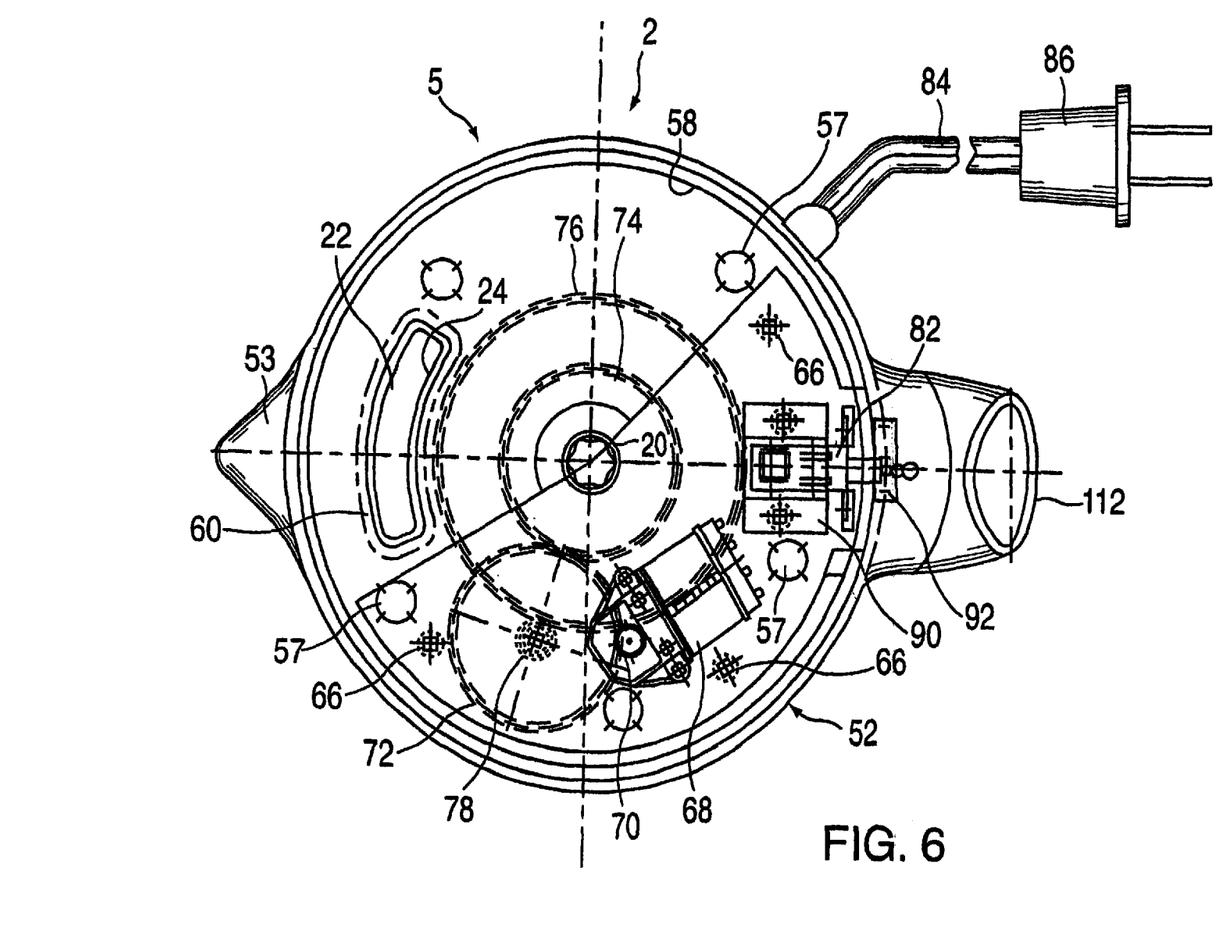
FIG. 6 is a plan sectional view of the apparatus of FIG. 3 taken along lines 6—6.
Figure 7:
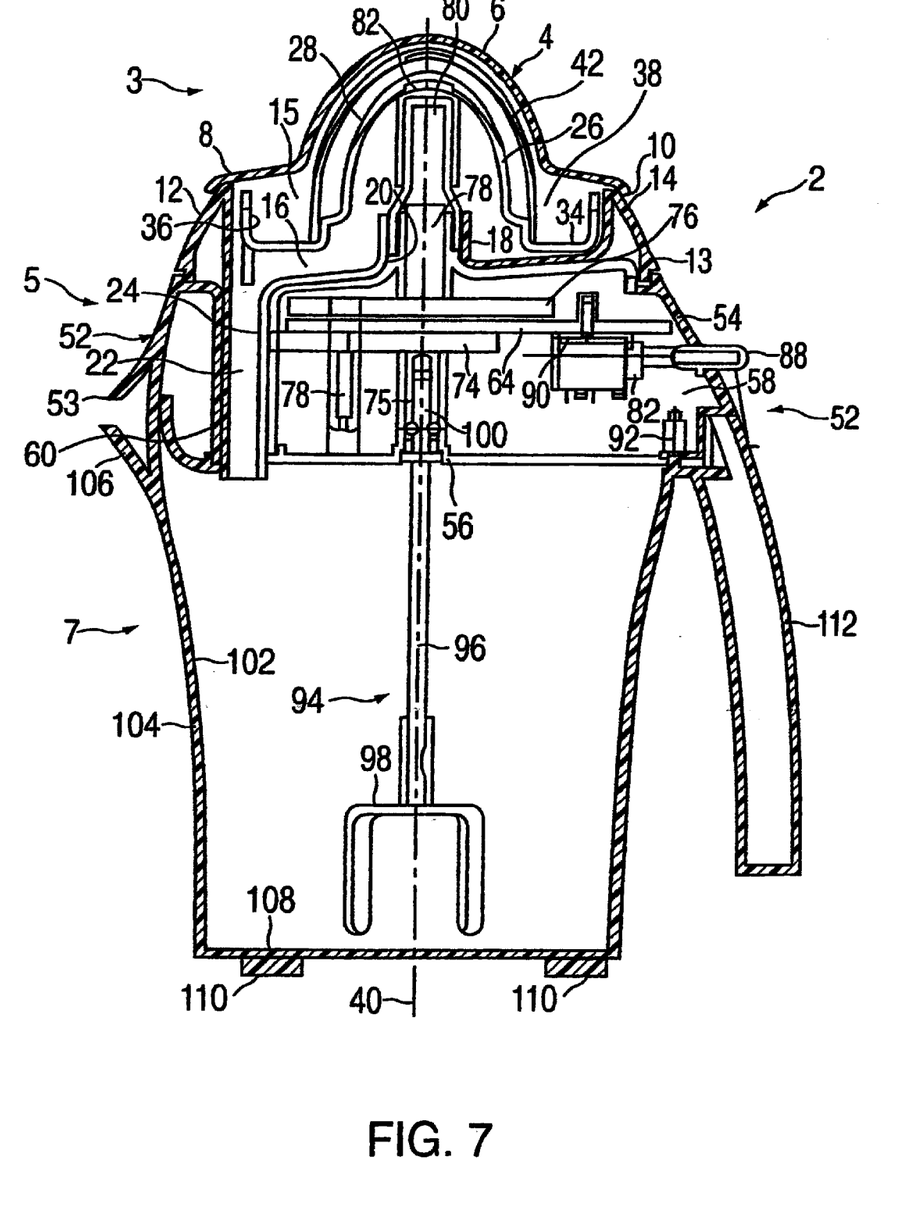
FIG. 7 is a side elevation sectional view of the apparatus of FIG. 1 taken along lines 7—7.

In FIGS. 5–7, a mounting plate 64 is secured to housing 52 member 54 by screws 66. Motor 68 is secured to the plate 64 by screws 69. Motor 68 has a shaft to which pinion gear 70, FIG. 6, is secured. Gear 70 drives transmission gear 72 which in turn drives mixing gear 74. Pinion gear 70 drives extraction gear 76. The two gears 74 and 76 are driven at different speeds, e.g., 300–600 rpm and 30–80 rpm, respectively in this embodiment. Gear 72 has a shaft mounted in bearing 78. Gear 76 drives shaft 78 which rotationally drives depending sleeve 80, FIG. 5, in extractor 26, preferably about 30–80 rpm. Shaft 78 has a hexagonal portion 78' which mates with a similar bore in sleeve 80. An adapter 82 may be placed over the shaft 78 for mating with the sleeve 80. The adapter may also fit in the collar 18 bore 20.

Gear 74 drives depending hollow shaft 75 with a hexagonal bore. Shaft 75 has a circular cylindrical outer surface located in bearing sleeve 77 integral and one piece with housing member 56.

On/off switch 82 is in compartment 58 and secured to plate 64. The switch 82 connects power to motor 68 via plug 86 and line 84, FIG. 6. A push button 88 operates the switch 82. The switch 82 is mounted to plate 64 by mount 90. A microswitch 92, FIG. 6, is included to provide a safety interlock to disable switch 82 unless module 5 properly engages module 7. This engagement activates switch 92 which enables switch 82 to supply power to the motor 68.

FIGS. 4, 5 and 7, a paddle 94 includes a shank 96, a bifurcated paddle member 98 and a coupler 100 which mates with the drive shaft 75. The paddle 94 depends from the module 5 into the compartment 102 of module 7. The compartment 102 is formed by container 104, preferably transparent molded thermoplastic. Container 104 forms a pitcher with a pouring spout 106 and handle 112. The container 104 has a bottom wall 108 supported on three soft thermoplastic or elastomeric base pads 110. The paddle 94 depends into the compartment 102 adjacent to the bottom wall 108. Thus the extractor 26 is driven preferably at a lower speed than the mixer paddle 94.

The handle 112 is molded thermoplastic and is attached to the container 104. The intermediate housing 52 nests within the container 104 upper rim.

The intermediate compartment 58 is in fluid isolation with respect to the module 3 compartment 13 and the container 104 compartment 102. Thus the motor and switch in this compartment 58 does not receive any liquid from the other compartments 13 and 102. The extension 24 passes the juice from the upper compartment 13 to the lower compartment 102 bypassing the intermediate compartment 58.

In operation, the button 88 is depressed turning on the motor 68. Microswitch 92 is activated at this time and enables switch 82. This action drives the extractor 26 and the paddle 94 simultaneously. The extractor 26 is preferably driven at a slower speed than the paddle 94 which is used for mixing beverages, e.g., lemonade, orangeade and so on, in the container 104 compartment 102. Various ingredients for a beverage such as water, honey or sugar, ice and so on are added to the compartment 102 by lifting the intermediate module 5 off of the lower module 7 exposing a wide mouth opening to the module 7 pitcher-like compartment 102.

After the ingredients are added, the modules 3 and 5 are place[ed] over the lower module 7 enclosing the compartment 102. The cover 4 is removed and the switch 82 activated to operate the motor 68. This rotates the extractor 26 (and extractor 42 if in place). Fresh fruit is then placed against the dome of the extractor and juice therefrom flows into the compartment 102 through the extension 24, bypassing the module 5 compartment.

At the same time, the paddle 94 mixes the beverage as the juice flows into the compartment. To pour the beverage, the intermediate and upper modules 5 and 3, respectively, are lifted off of the container 104 which is now an open top pitcher.

Figure 1:
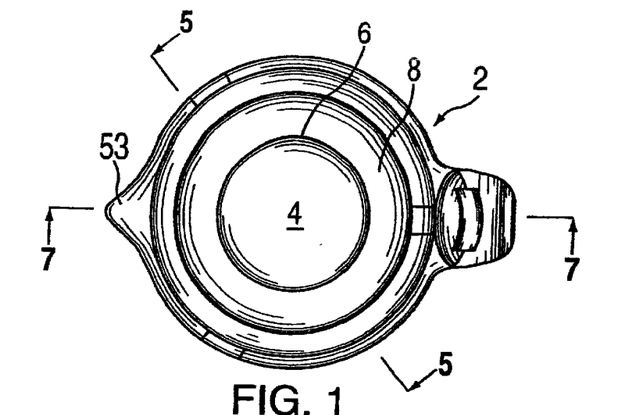
FIG. 1 is a plan view of the mixer apparatus according to an embodiment of the present invention.
Figure 2:
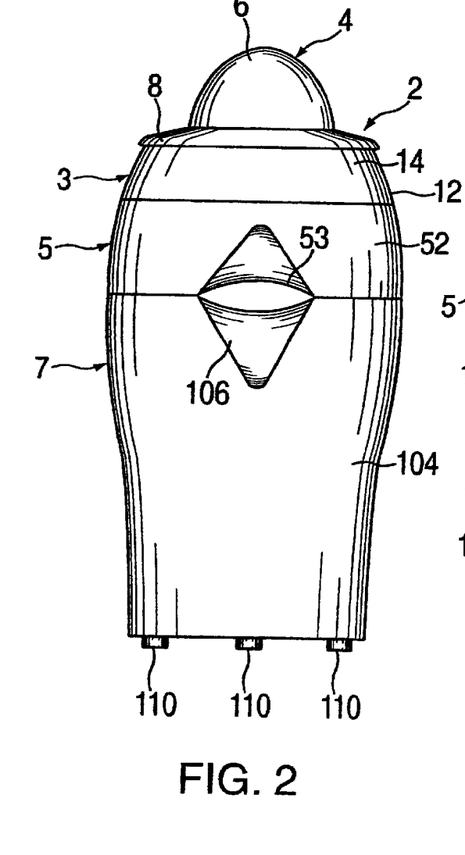
FIG. 2 is a front elevation view of the apparatus of FIG. 1.
Figure 3:
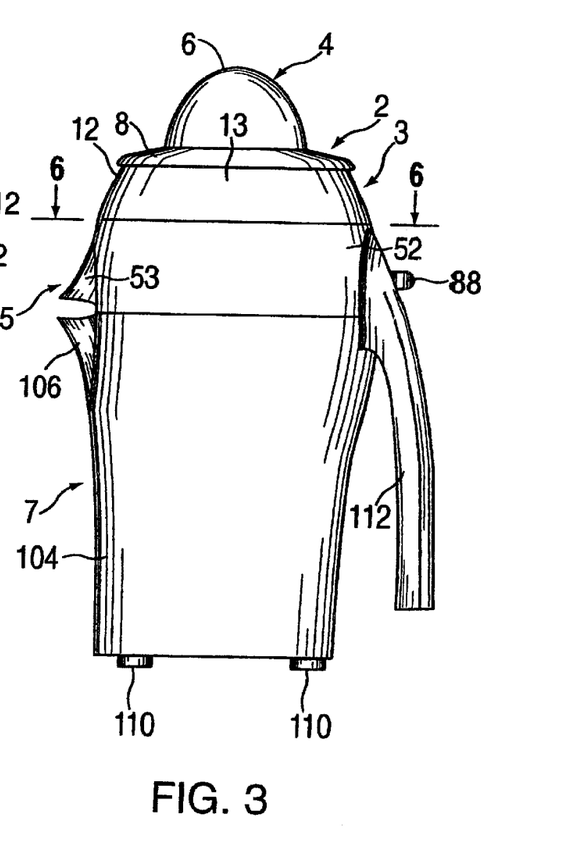
FIG. 3 is a side elevation view of the apparatus of FIG. 1.

The module 5 spout portion 53 is spaced from spout 106 of lower module 7, FIG. 2. This spacing permits liquid to escape from compartment 102 more easily in case of over filling of the compartment 102.

The modules 3, 5 and 7 are easily separated for cleaning of the components thereof. The extractor 26 (and extractor 42) are also easily removed for cleaning. The paddle 94 is also easily removed for cleaning.

The electronics in drive module 5 are generally in fluid isolation from the other modules. In other embodiments, module 5 may be sealed with gaskets (not shown) relative to the other modules. Module 5 does not need internal cleaning and may be easily cleaned externally. The drive shafts 78 and 94 may be optionally fluid sealed to the module 5 housing 52 members 54 and 56, FIGS. 5 and 7, by seals (not shown).

In the alternative, although not presently so designed, the module 3 may be configured to be placed directly on the module 7 for manual operation of the extractor and for manually mixing the beverage if desired without the module 5 in place.

Module 5 may be used to solely mix a beverage without use of the extractor simply by placing ingredients in the compartment 102 and operating the paddle 94. In the alternative, the extractor may be used to provide fruit juice without adding ingredients to the mixing module, if desired, to provide a simple juice extractor.

Further, a module (not shown) similar to module 5, may be provided to either selectively provide only the mixing function or the extraction function without doing both simultaneously. For example, such a module has one drive shaft extending therefrom. As a mixing module, the paddle is attached to the drive shaft and used to mix ingredients in the beverage compartment 102. The module may be inverted so the drive shaft is upright for driving the extractor in the extractor module. The drive shaft may have selected different speeds, but mates with a paddle and extractor with the same coupling.

While a motor is preferably employed to drive the extractor and paddle, it will occur that a manually operated crank in the drive module can perform the same function.

Second Preferred Embodiment

Figure 8:
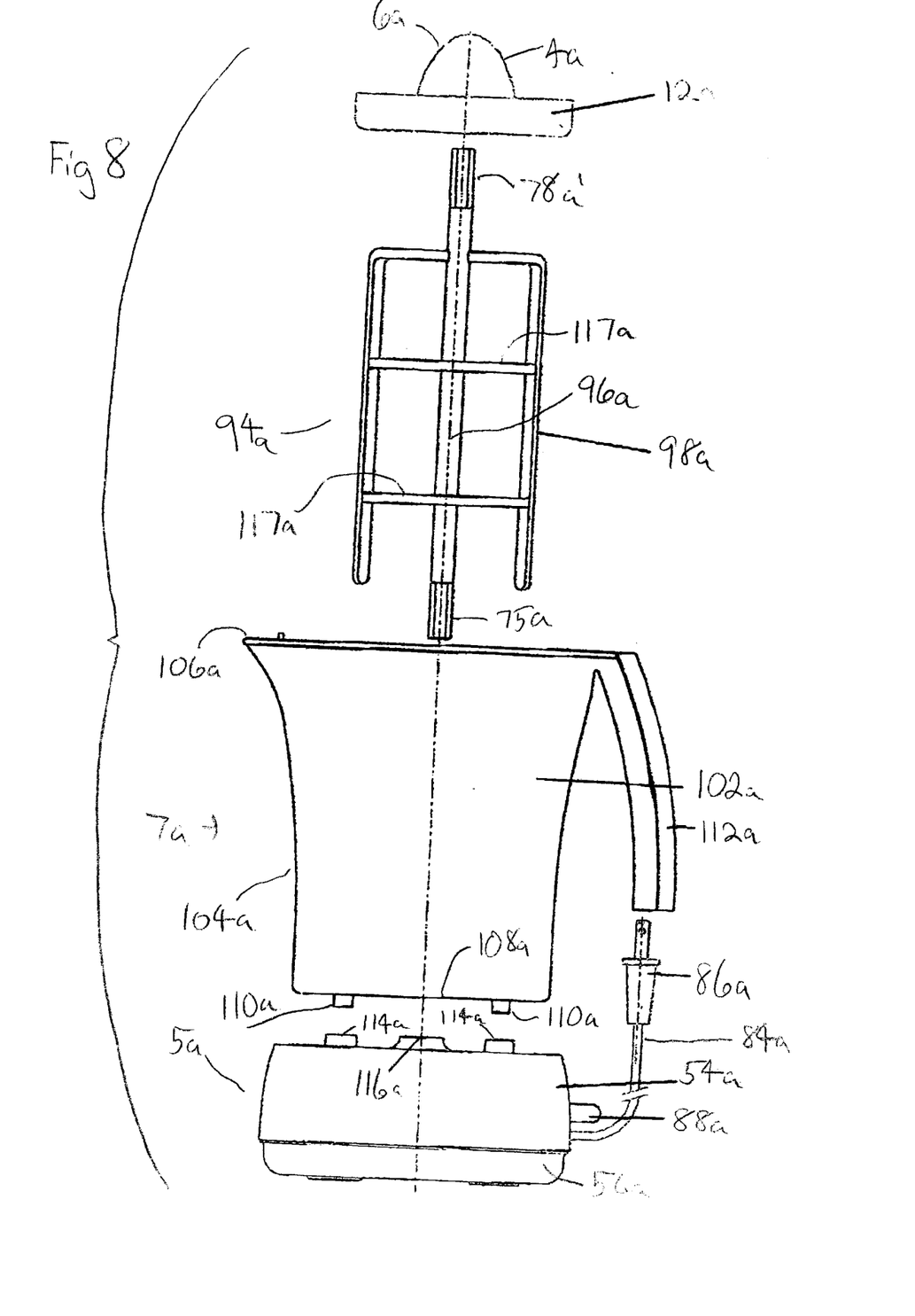
FIG. 8 is an exploded side elevation view of a second preferred embodiment of the present invention.

In FIG. 8, an alternative preferred embodiment of the invention is shown. The apparatus includes a juice extraction and collection module 3a, a drive module 5a and a mixing module 7a. The module 3a includes a preferably molded thermoplastic transparent cover 4a and juice collector 12a. The cover 4a comprises a hollow cone-shaped dome 6a and an outer peripheral flange 8a. The module 3a is shown with the cover 4a in place, and is substantially the same as shown and described in FIG. 4, having the same cover, lip 10, an optional extractor 42, juice extractor 26, and pulp filter formed from a plurality of fingers 29. Module 3a, however, does not have the elongated arcuate bore, FIG. 6, nor the extension 24, which depends from trough 16. Instead of the bore and extension, module 3a allows the extracted juice to drain through a plurality of fingers 29 FIG. 4, forming the pulp filter. In the alternative, a screen structure may also form a filter in the bottom wall of juice collector 12a, or, in the alternative, the filter may comprise any convenient apertured arrangement for filtering the pulp from the juice. The diameter of the juice collector housing 13a is smaller than that of the upper opening of the container 104a, and is spaced above the container 104a. This spacing permits liquid to escape the juice collector housing 13a and still be captured by the container 104a in case of over filling of the housing 13a or obstruction of the drain holes.

The beverage mixer 7a has an annular mixing compartment, with a central hollow region wherein the driver spindle is located. The diameter of the central hollow region is greater than the diameter of the drive spindle so that the drive spindle may rotate within the central hollow region without contact with the walls of the central hollow region. The paddle has two arms each of which extend out laterally and downward from the upper portion of the drive spindle and into the beverage mixer. The offset paddle is operated by the driving mechanism, which includes an electric motor.

The beverage mixer 7a has an annular configuration, and is driven by the drive module 5a which is below both the juice extractor module 3a and the beverage mixer module 7a. The beverage mixer is provided with an aperture 115a in substantial fluid isolation from the container compartment 102a, so that the drive shaft 75a may project through the aperture 115a and a corresponding aperture 116a in upper housing portion 54a of module 5a. The paddle 94a of the beverage mixer 7a rotates through the beverage mixer compartment 102a, the paddle 94a having a plurality of arms 98a, each projecting outwardly and axially from the shaft 96a.

Figure 9:
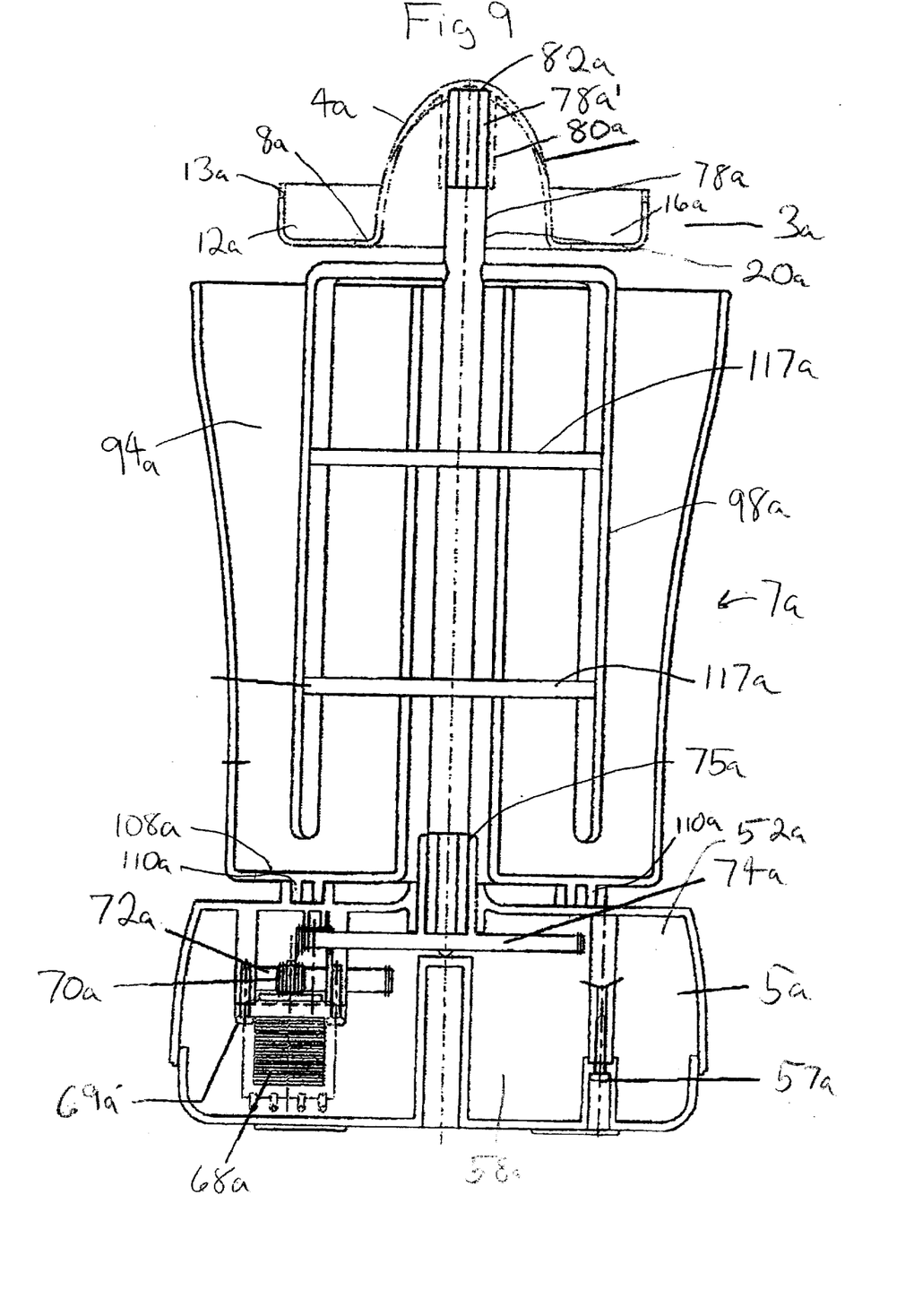
FIG. 9 is a rear sectional view of a second preferred embodiment of the present invention.
Figure 10:
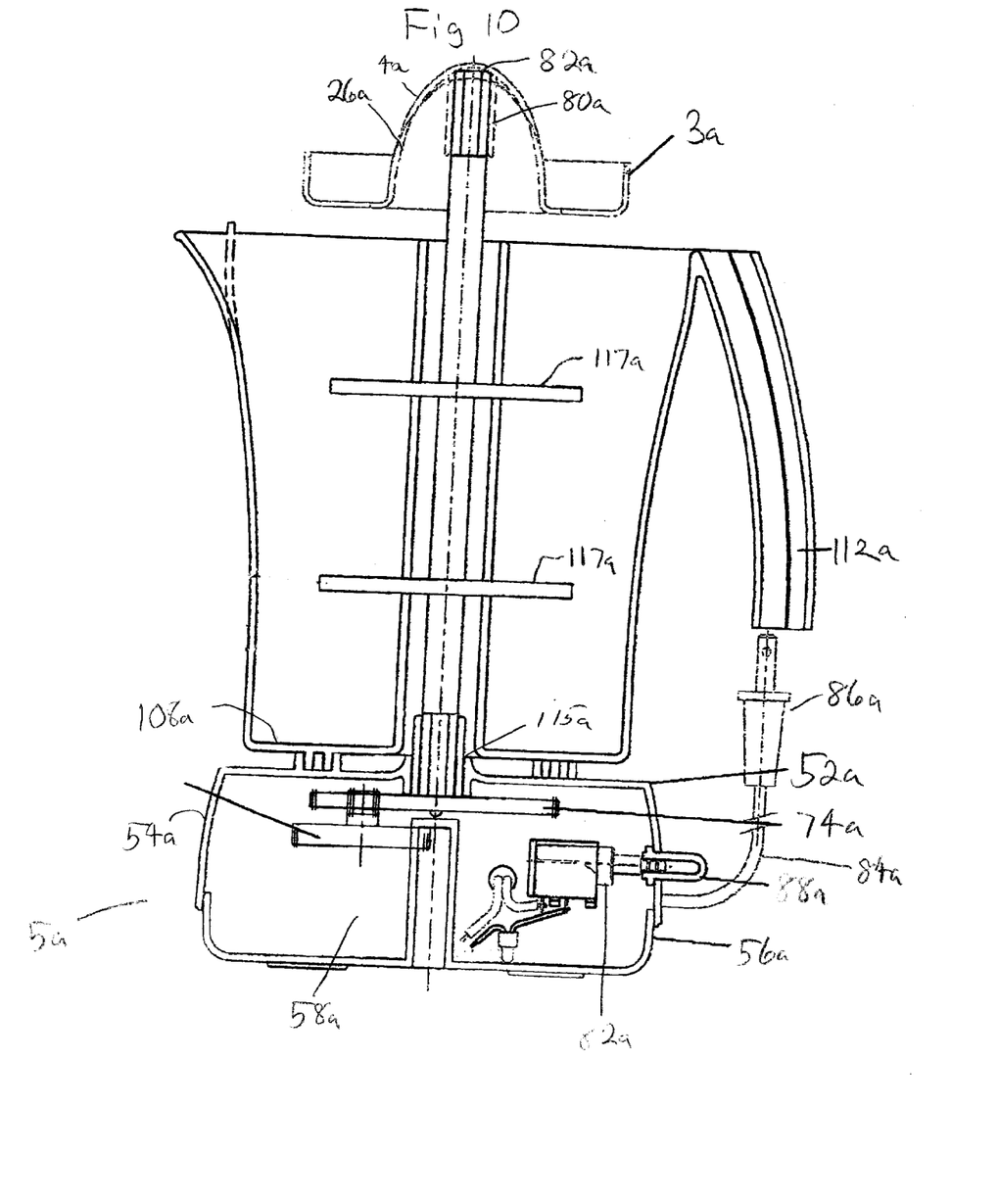
FIG. 10 is side sectional view of a second preferred embodiment of the present invention.

FIGS. 8, 9 and 10, a paddle 94 includes a shank 96a, a bifurcated paddle member 98a terminating in a drive shaft 75a. The paddle 94a depends from the module 3a into the compartment 104a of module 7a and is secured within module 5a. The compartment 102a is formed by container 104a, preferably transparent molded thermoplastic. Container 104a forms a pitcher with a pouring spout 106a and handle 112a. The container 104a has a bottom wall 108a supported on two thermoplastic projections 110a which engage with mating projections 114a on module 5a. The engagement of projections 110a and projections 114a provides a secure connection between module 7a and 5a to allow operation of the apparatus.

The container bottom wall 108a also has a central opening 115a which permits the drive shaft 75a to pass through bottom wall 108a and through a mated opening 116a in module 5a for engagement with gear 74a. The paddle 94 depends into the compartment 102a adjacent to the bottom wall 108a. Thus the extractor 26 (shown in FIG. 4) is driven preferably at the same speed as that of the mixer paddle 94a.

The arms 98a are supported by stabilizing members 117a, which secure the arms 98a at two points in addition to the upper connection to shank 96a. The handle 112a is molded thermoplastic and is attached to the container 104a.

Drive module 5a comprises a molded two piece thermoplastic annular housing 52a. Housing 52a has an upper member 54a which mates with and is fixed to lower member 56a, FIGS. 9 and 10, by housing screw 57a. The members 54a and 56a form a compartment 58a.

Figure 11:
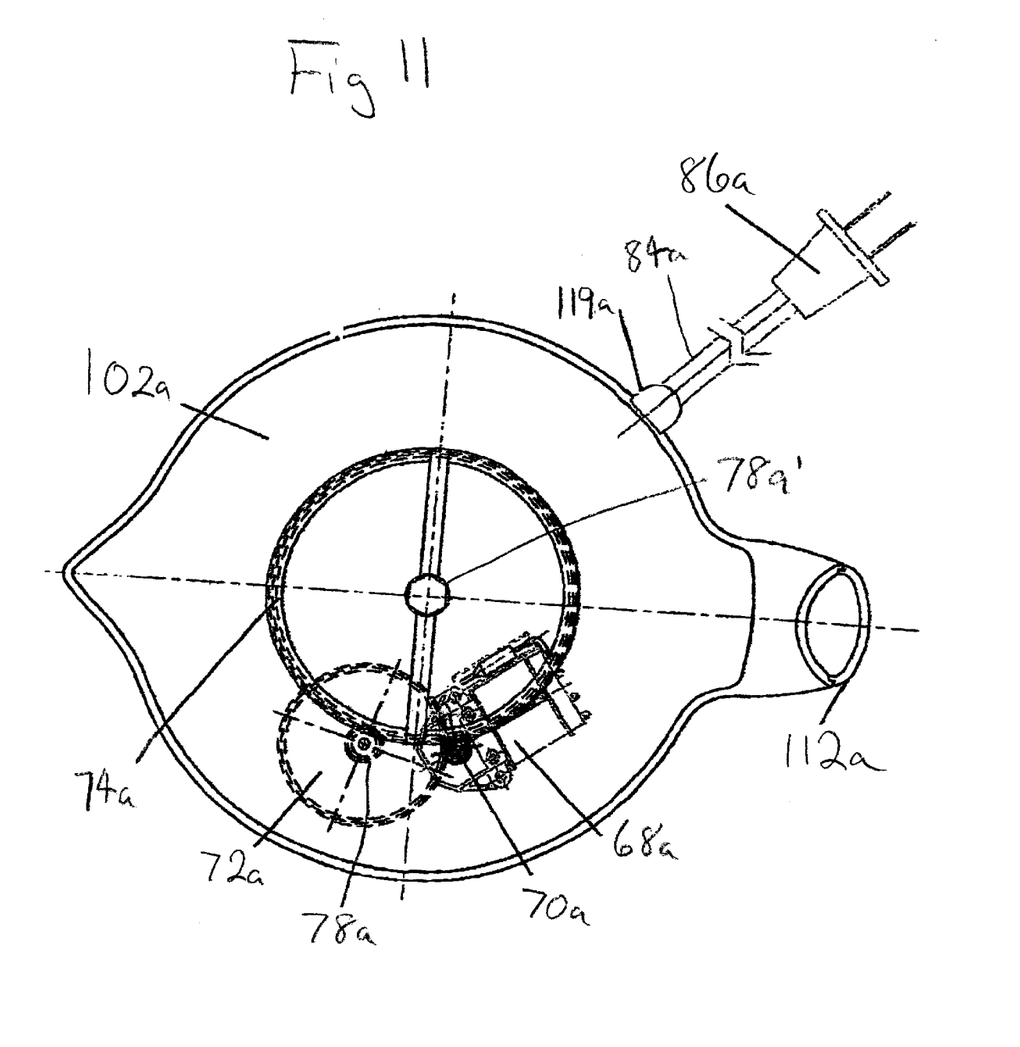
FIG. 11 is top view, partially in section, of a second preferred embodiment of the present invention.

In FIGS. 9–11, motor 68a is secured to the housing 52a by a motor mounting screw 69a. Motor 68a has a motor gear 70a, which drives transmission gear 72a which in turn drives a combined extraction and mixing gear 74a. Gear 72a has a shaft mounted in bearing 78a. Gear 74a drives shaft 78a which rotationally drives depending sleeve 80a in extractor 26a. Shaft 78a has a hexagonal portion 78a' which mates with a similar bore in sleeve 80a. An adapter 82a may be placed over the shaft 78a for mating with the sleeve 80a.

On/off switch 82a is in compartment 58a. The switch 82a connects power to motor 68a via plug 86a and line 84a, FIG. 10. Strain on the line 84a is relieved by means of a cord bush 119a, FIG. 11. A push button 88a operates the switch 82a. A push button 88a operates the switch 82a.

Third Preferred Embodiment

Figure 12:
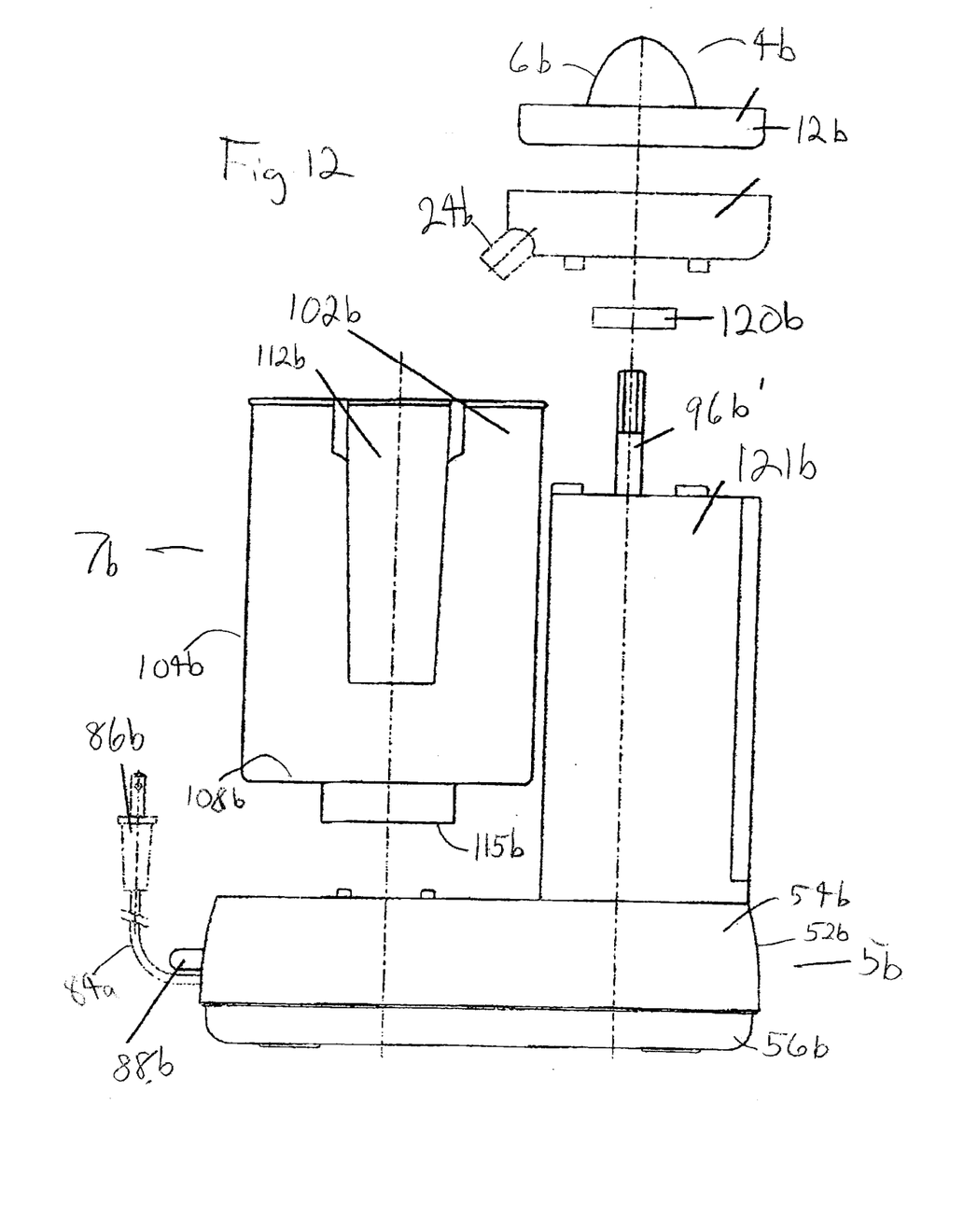
FIG. 12 is an exploded side elevation view of a third preferred embodiment of the present invention.
Figure 13:
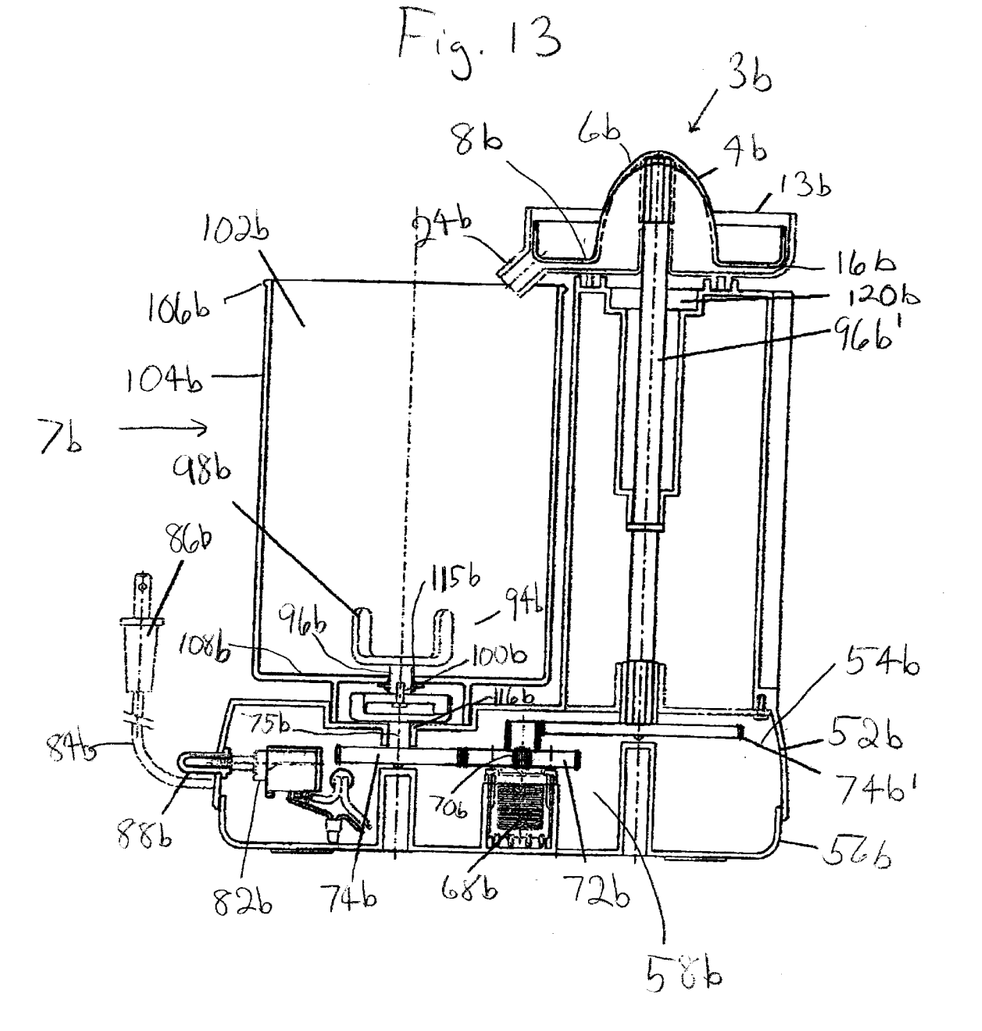
FIG. 13 is a side sectional view of a third preferred embodiment of the present invention.
Figure 14:
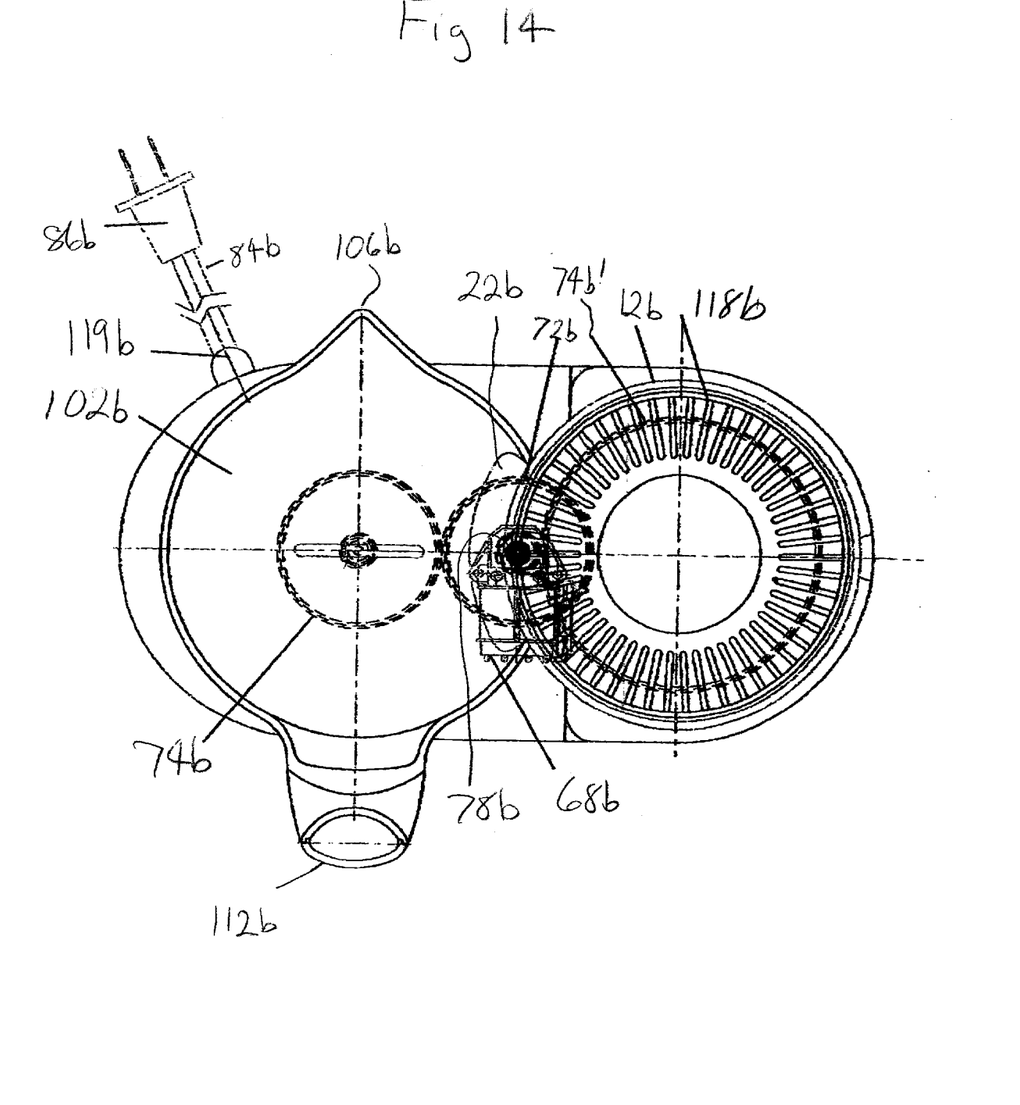
FIG. 14 is top view, partially in section, of a second preferred embodiment of the present invention.

In FIGS. 12 and 13, an alternative preferred embodiment of the invention is shown. The apparatus includes a juice extraction and collection module 3b, a drive module 5b and a mixing module 7b. The module 3b includes a preferably molded thermoplastic transparent cover 4b and juice collector 12b. The cover 4b comprises a hollow cone-shaped dome 6b and an outer peripheral flange 8b. The module 3b is shown with the cover 4b in place, and is substantially the same as shown and described in FIG. 4, having the same cover, lip 10, an optional extractor 42, juice extractor 26, and pulp filter formed from a plurality of fingers 29. Module 3b also has an elongated arcuate bore 22b, FIG. 14, and an extension 24b, which depends from trough 16b. Extracted juice flows through a plurality of fingers 29 FIG. 4, forming the pulp filter, and exits through the elongated bore 22b and through extension 24b into compartment 102b of container 104b. In the alternative, a screen structure 118b, FIG. 14, may also form a filter in the bottom wall of juice collector 12b, or, in the alternative, the filter may comprise any convenient apertured arrangement for filtering the pulp from the juice.

The beverage mixer 7b has an annular configuration, and is driven by the drive module 5b which is below both the juice extractor module 3b and the beverage mixer module 7b. The extractor module 3b and the beverage mixer module 7b in this embodiment are side by side and both are seated on and operationally engaged with drive module 5b. The beverage mixer is provided with an aperture 115b in substantial fluid isolation from the container compartment 102b, so that the drive shaft 75b may project through the aperture 115b and a corresponding aperture 116b in upper housing portion 54b of module 5b. The paddle 94b of the beverage mixer 7b rotates through the beverage mixer compartment 102b, the paddle 94b having a plurality of arms 98b, each projecting outwardly and axially from the shaft 96b.

The housing 52b of drive module 5b is provided with an elongated hollow portion in substantial fluid isolation from both the container compartment 102b and the extractor module 3b, so that the drive shaft 96b' may project through the hollow portion 120 and through a nylon bushing 120 and into engagement with the extractor 26, FIG. 4, for rotation of the extractor to ream the fruit and extract juice.

FIGS. 12 and 13, a paddle 94b includes a shank 96b, a bifurcated paddle member 98b, and a coupler 100b which mates with the drive shaft 75b. The paddle 94b depends from the module 5b into the compartment 102b of container 104b of module 7b. The compartment 102b is formed by container 104b, preferably transparent molded thermoplastic. Container 104b forms a pitcher with a pouring spout 106b and handle 112b. The container 104b has a bottom wall 108b supported on a central opening 115b which permits the drive shaft 75b to pass through bottom wall 108b and through a mated opening 116b in module 5b for engagement with gear 74b. The paddle 94b depends into the compartment 102b adjacent to the bottom wall 108b. Thus the extractor 26 (shown in FIG. 4) is driven preferably at a lower speed than the mixer paddle 94b. The handle 112a is molded thermoplastic and is attached to the container 104a.

Drive module 5b comprises a molded two piece thermoplastic annular housing 52b. Housing 52b has an upper member 54b which mates with and is fixed to lower member 56b, FIG. 13, by housing screws (not shown). The members 54b and 56b form a compartment 58b.

In FIG. 13, motor 68a has a motor gear 70b, which drives transmission gear 72a which in turn drives two separate gears; a mixing gear 74b and an extraction gear 74b'. Thus, in contrast to the other embodiments of the invention, two separate gears are employed for the extraction and mixing operations. In turn, the mixing gear 74b drives shaft 96b which rotates the paddle 94b. Extraction gear 74b' drives shaft 96b' which rotates the extractor 26, FIG. 4, which reams the fruit and extracts the juice. The extraction shaft 96b' preferably extends upward through a nylon bushing 120.

On/off switch 82b is in compartment 58b. The switch 82b connects power to motor 68b via plug 86b and line 84b, FIG. 14. Strain on the line 84b is relieved by means of a cord bush 119b. A push button 88b operates the switch 82b.

It will occur to one of ordinary skill that various modifications may be made to the disclosed embodiments. The embodiments disclosed are by way of illustration and not limitation. It is intended that the scope of the invention is as defined by the appended claims.

For example, while the extractor and mixing paddle are rotated simultaneously, they may be rotated selectively at different times. A clutch device (not shown) may be included for selectively coupling either the extractor or the mixing paddle to the motor. Multiple switches and motors may also selectively operate the mixing or extracting functions. Also, the speeds of the extractor and paddles may be varied by a variable or step speed control including a potentiometer or a resistor network (not shown), for example, for selecting a desired speed for the extractor and for the paddle.

What is claimed is:

1. A juice extractor and beverage mixer apparatus comprising:
   a juice extractor for extracting juice from fruit;
   a mixing module in fluid communication with the juice extractor for receiving extracted juice from the juice extractor and for receiving beverage ingredients;
   the mixing module having an annular mixing compartment;
   the mixing module having a beverage mixer therein for mechanically stirring and mixing a juice beverage in the mixing module from the extracted juice and beverage ingredients;
   a base having an electrically operated drive mechanism for rotationally operating the juice extractor and beverage mixer, the base being in substantial fluid isolation from the mixing module;
   the base further having an upper surface for receiving and supporting the mixing module;
   the upper surface of the base being configured for substantially secure engagement with a mating portion of the mixing module;
   a drive shaft having a lower section and an upper section;
   the electrically operated drive mechanism being operably engaged with the lower section of the drive shaft for rotating the drive shaft;
   the upper section of the drive shaft being operably engaged with the juice extractor;
   the drive shaft being operably engaged with the beverage mixer at a point between the upper section and the lower section of the drive shaft;
   the drive shaft being rotatable within a hollow region of the mixing module.

2. The juice extractor and beverage mixer apparatus of claim 1 comprising a plurality of different juice extractors each for releasably interchangeable engagement with the upper section of the drive shaft for extracting juice from a corresponding different size fruit.

3. The juice extractor and beverage mixer apparatus of claim 1 further comprising a removable cover for the juice extractor.

4. The juice extractor and beverage mixer apparatus of claim 3 wherein the removable cover is substantially composed of a thermoplastic material.

5. The juice extractor and beverage mixer apparatus of claim 3 wherein the removable cover is substantially transparent.

6. The juice extractor and beverage mixer apparatus of claim 1 wherein the juice extractor comprises a convex fruit receiving member with a fluted undulating outer fruit receiving surface terminating at an apex.

7. The juice extractor and beverage mixer apparatus of claim 1 wherein the juice extractor has a pulp filter.

8. The juice extractor and beverage mixer apparatus of claim 7 wherein the pulp filter comprises a plurality of fingers for filtering pulp from extracted juice.

9. The juice extractor and beverage mixer apparatus of claim 1, wherein the beverage mixer comprises a paddle having a plurality of arms.

10. The juice extractor and beverage mixer apparatus of claim 1 wherein the mixing module forms a pitcher having a pouring spout and a handle.

11. A juice extractor and beverage mixer apparatus comprising:
    a juice extractor module having a juice extractor for extracting juice from fruit;
    a mixing module in fluid communication with the juice extractor for receiving extracted juice from the juice extractor and for receiving beverage ingredients;
    the mixing module having a beverage mixer therein for mechanically stirring and mixing a juice beverage in the mixing module from the extracted juice and beverage ingredients;
    a base disposed beneath the juice extractor module and the mixing module, having an electrically operated drive mechanism for rotationally operating the juice extractor and beverage mixer, the base being in substantial fluid isolation from the mixing module and from the juice extractor module;
    the base further having an upper surface for receiving and supporting the juice extractor module and the mixing module;
    the upper surface of the base being configured for substantially secure engagement with a mating portion of the mixing module;
    a first drive shaft having a lower section and an upper section;
    the electrically operated drive mechanism being operably engaged with the lower section of the first drive shaft for rotating the first drive shaft;
    the upper section of the first drive shaft being operably engaged with the juice extractor;
    a second drive shaft having a lower section and an upper section;
    the electrically operated drive mechanism being operably engaged with the lower section of the second drive shaft for rotating the second drive shaft;
    the upper section of the second drive shaft being operably engaged with the beverage mixer;
    the second drive shaft being rotatable within an aperture of the mixing module.

12. The juice extractor and beverage mixer apparatus of claim 11 comprising a plurality of different juice extractors each for releasably interchangeable engagement with the upper section of the first drive shaft for extracting juice from a corresponding different size fruit.

13. The juice extractor and beverage mixer apparatus of claim 11 further comprising a removable cover for the juice extractor.

14. The juice extractor and beverage mixer apparatus of claim 13 wherein the removable cover is substantially composed of a thermoplastic material.

15. The juice extractor and beverage mixer apparatus of claim 13 wherein the removable cover is substantially transparent.

16. The juice extractor and beverage mixer apparatus of claim 11 wherein the juice extractor comprises a convex fruit receiving member with a fluted undulating outer fruit receiving surface terminating at an apex.

17. The juice extractor and beverage mixer apparatus of claim 11 wherein the juice extractor has a pulp filter.

18. The juice extractor and beverage mixer apparatus of claim 17 wherein the pulp filter comprises a plurality of fingers for filtering pulp from extracted juice.

19. The juice extractor and beverage mixer apparatus of claim 17 wherein the pulp filter comprises a screen for filtering pulp from extracted juice.

20. The juice extractor and beverage mixer apparatus of claim 11, wherein the beverage mixer comprises a paddle having a plurality of arms.

21. The juice extractor and beverage mixer apparatus of claim 11 wherein the mixing module forms a pitcher having a pouring spout and a handle.

22. A juice extractor and beverage mixer apparatus comprising:

a juice extractor module having a juice extractor for extracting juice from fruit;

a mixing module in fluid communication with the juice extractor for receiving extracted juice from the juice extractor and for receiving beverage ingredients;

the mixing module having a beverage mixer therein for mechanically stirring and mixing a juice beverage in the mixing module from the extracted juice and beverage ingredients;

a base disposed beneath the juice extractor module and the mixing module, having an electrically operated drive mechanism for rotationally operating the juice extractor and beverage mixer, the base being in substantial fluid isolation from the mixing module and from the juice extractor module;

the base further having an upper surface for receiving and supporting the juice extractor module and the mixing module;

the upper surface of the base being configured for substantially secure engagement with a mating portion of the mixing module;

a first drive shaft having a lower section and an upper section;

the electrically operated drive mechanism being operably engaged with a first gear, the first gear being operably engaged with the lower section of the first drive shaft for rotating the first drive shaft;

the upper section of the first drive shaft being operably engaged with the juice extractor;

a second drive shaft having a lower section and an upper section;

the electrically operated drive mechanism being operably engaged with a second gear, the second gear being operably engaged with the lower section of the second drive shaft for rotating the second drive shaft;

the upper section of the second drive shaft being operably engaged with the beverage mixer;

the second shaft being rotatable within an aperture of the mixing module.

23. The juice extractor and beverage mixer apparatus of claim 22 comprising a plurality of different juice extractors each for releasably interchangeable engagement with the upper section of the first drive shaft for extracting juice from a corresponding different size fruit.

24. The juice extractor and beverage mixer apparatus of claim 22 further comprising a removable cover for the juice extractor.

25. The juice extractor and beverage mixer apparatus of claim 24 wherein the removable cover is substantially composed of a thermoplastic material.

26. The juice extractor and beverage mixer apparatus of claim 24 wherein the removable cover is substantially transparent.

27. The juice extractor and beverage mixer apparatus of claim 22 wherein the juice extractor comprises a convex fruit receiving member with a fluted undulating outer fruit receiving surface terminating at an apex.

28. The juice extractor and beverage mixer apparatus of claim 22 wherein the juice extractor module has a pulp filter.

29. The juice extractor and beverage mixer apparatus of claim 28 wherein the pulp filter comprises a plurality of fingers for filtering pulp from extracted juice.

30. The juice extractor and beverage mixer apparatus of claim 28 wherein the pulp filter comprises a screen for filtering pulp from extracted juice.

31. The juice extractor and beverage mixer apparatus of claim 22 wherein the beverage mixer comprises a paddle having a plurality of arms.

32. The juice extractor and beverage mixer apparatus of claim 22 wherein the mixing module forms a pitcher having a pouring spout and a handle.

33. The juice extractor and beverage mixer apparatus of claim 22 wherein the first gear operates the first drive shaft and the second gear operates the second drive shaft at different rotational speeds.

* * * * *